United States Patent [19]
Silk et al.

[11] Patent Number: 6,091,764
[45] Date of Patent: Jul. 18, 2000

[54] METHOD AND APPARATUS FOR WIRELESS RS232 COMMUNICATION

[75] Inventors: S. David Silk, Palatine; Edward C. Porrett, Elgin, both of Ill.

[73] Assignee: Motorola, Inc., Schaumburg, Ill.

[21] Appl. No.: 08/959,768

[22] Filed: Oct. 29, 1997

[51] Int. Cl.$^7$ ...................................................... H04B 1/38
[52] U.S. Cl. ........................ 375/219; 375/222; 370/349; 370/451; 370/535
[58] Field of Search ..................... 375/219, 232, 375/346, 347, 130, 222; 370/535, 451, 349; 395/200.62

[56] References Cited

U.S. PATENT DOCUMENTS

| | | | |
|---|---|---|---|
| 4,663,755 | 5/1987 | Lewis | 370/535 |
| 4,665,519 | 5/1987 | Kirchner et al. | 370/349 |
| 4,667,323 | 5/1987 | Engdahl et al. | 370/451 |
| 5,815,667 | 9/1998 | Chien et al. | 395/200.62 |

*Primary Examiner*—Stephen Chin
*Assistant Examiner*—Shuwang Liu

[57] ABSTRACT

A controller circuit (107) between a transceiver (104) and an RS232communication port (103) provides wireless communication to a remote unit and includes a transmitting and receiving mode indicator (503), a first delay circuit (506) for delaying a packet of data (501) before being transmitted, a timer (502) counting a period of time during which delaying termination of transmitting mode following a last data bit of the packet of data (501). Further, a receive signal detector (504) produces a carrier detect signal (521) and its delayed version (525) through a second delay (522) when a data packet (520) is received from the transceiver (104), first and second AND gates (523, 528) and a third delay circuit (526) receive signals (525 and 520) to produce a reformatted received data packet (529) compatible to the RS232format for input to the RS232communication port (103).

5 Claims, 3 Drawing Sheets

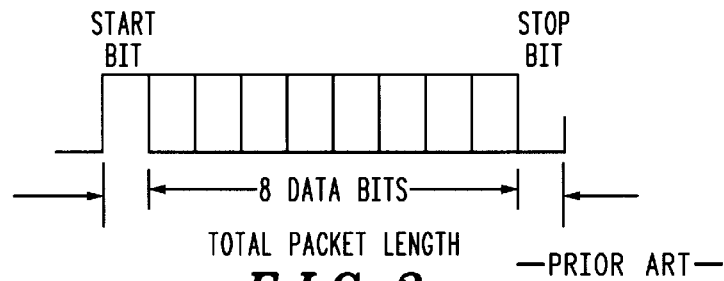
FIG.3 —PRIOR ART—
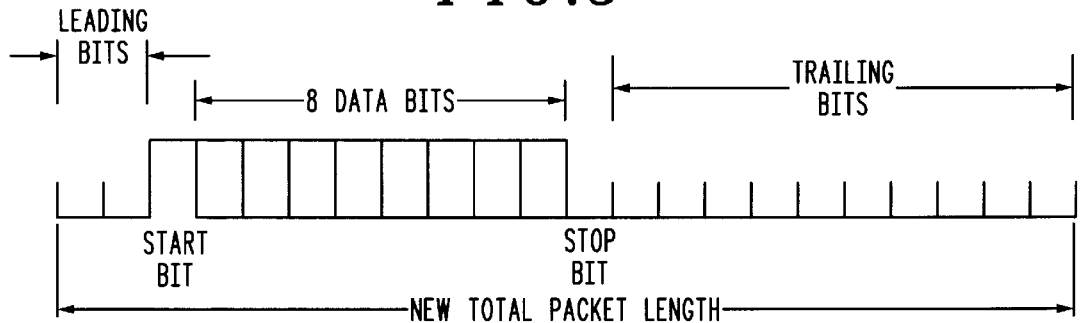
FIG.4
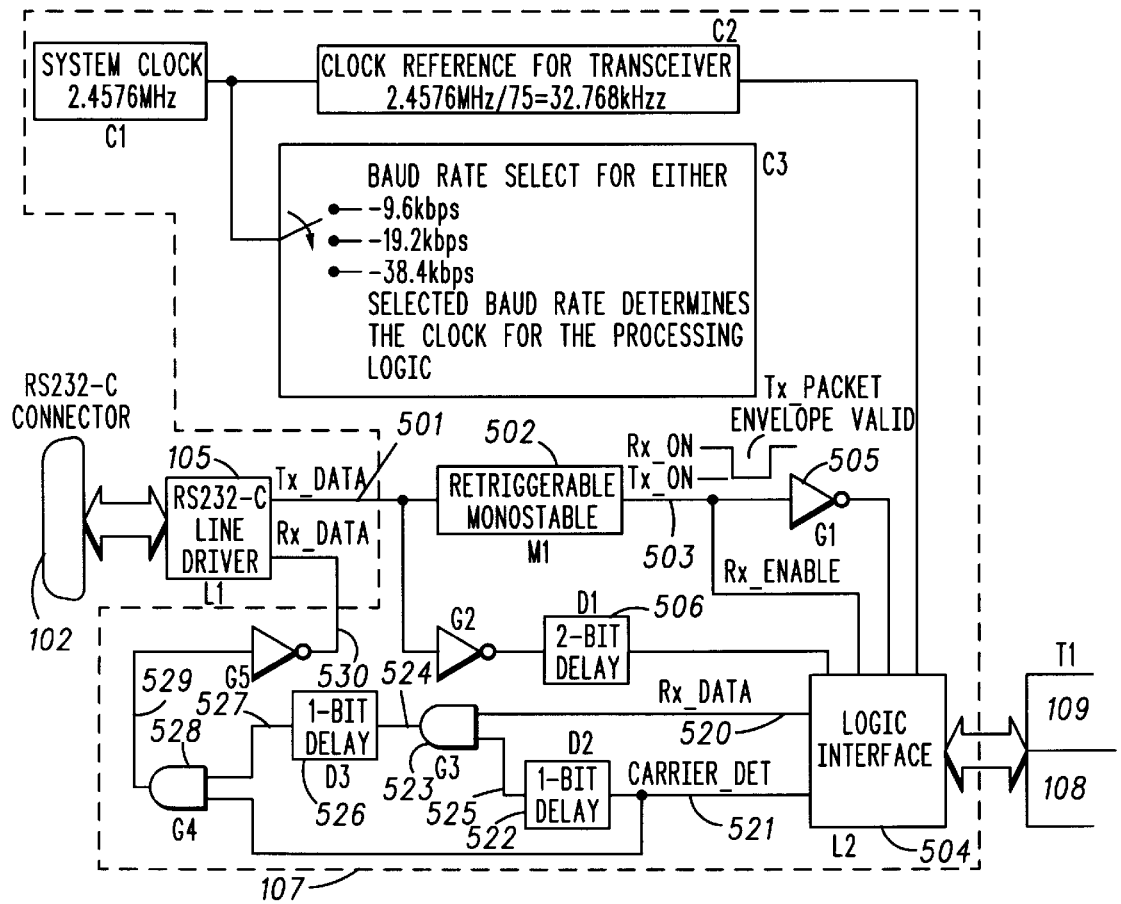
FIG.5

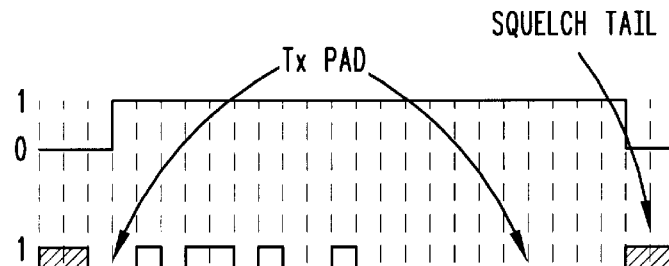
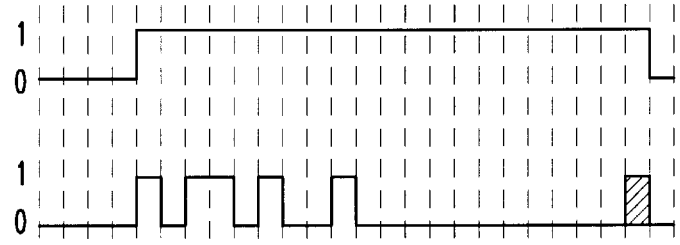
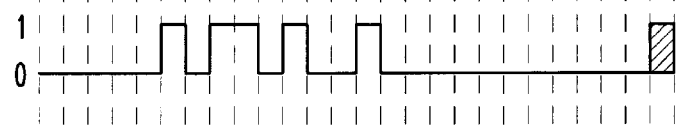
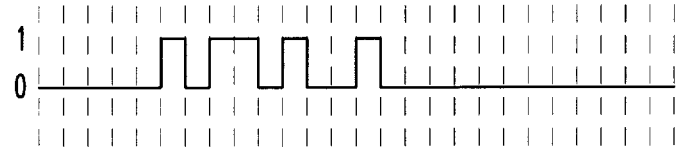
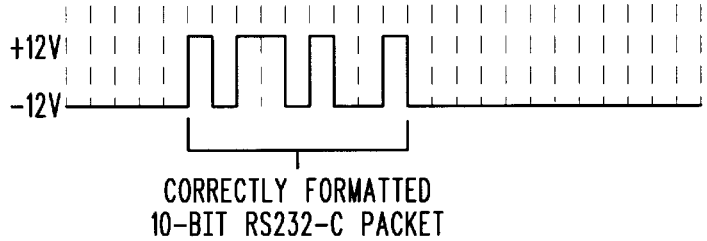
FIG.6

METHOD AND APPARATUS FOR WIRELESS RS232 COMMUNICATION

FIELD OF THE INVENTION

The present invention generally relates to wireless communication, and more particularly, in an environment with RS232 data communication signaling format.

BACKGROUND OF THE INVENTION

An RS232 compliant communication port is readily available on every computer for establishing a communication link to another unit. To make the communication link, the RS232 communication port should be wired to another RS232 compliant communication port. For a wired connection in some cases, however, the communicating units are located far apart and inaccessible. One such case is shown in FIG. 1 where a mobile user needs to establish a communication link from the RS232 communication port of his palm top computer to an inaccessible cellular base station located high above on a pole. Such a need often arises in connection with servicing or retrieving data from the remote base station.

To solve the problem of inaccessibility, a wireless communication link very often is substituted for the wired connection. The wireless communication link is made directly from the RS232 port through a transceiver transmitting and receiving at infrared (IR) frequency or radio frequency (RF). However, the limited number of input and output lines at an RS232 communication port does not readily provide any control over a transceiver operation. The RS232 communication port signaling is based on a Universal Asynchronous Receiver Transmitter (UART) signaling where the time for transmitting and receiving are not predetermined. Since every receiver has a limited response time, some of the initial data bits are lost due to the response time when an asynchronous signal is received at the receiver. This results in highly unreliable wireless communication. A possible solution is to control the transceiver module externally. However, with this solution, standard RS232 communication ports would be required to have additional hardware or software that is not typically available on host computers.

Therefore, there is a need for a method and an apparatus for independently controlling a transceiver module for a wireless communication in an environment with RS232 data communication signaling format.

BRIEF DESCRIPTION OF THE DRAWINGS

FIG. 3 depicts a standard RS232 data packet format.

FIG. 4 depicts long formatted data packet according to one aspect of the present invention.

FIG. 5 depicts a controller for controlling the interface between an RS232communication port and a transceiver according to various aspects of the present invention.

FIG. 6 depicts a graphical representation of reformatting a received data packet in long format to be compatible to an RS232 data packet standard according to an aspect of the present invention.

DETAILED DESCRIPTION OF THE PREFERRED EMBODIMENTS(S)

Figure 1:
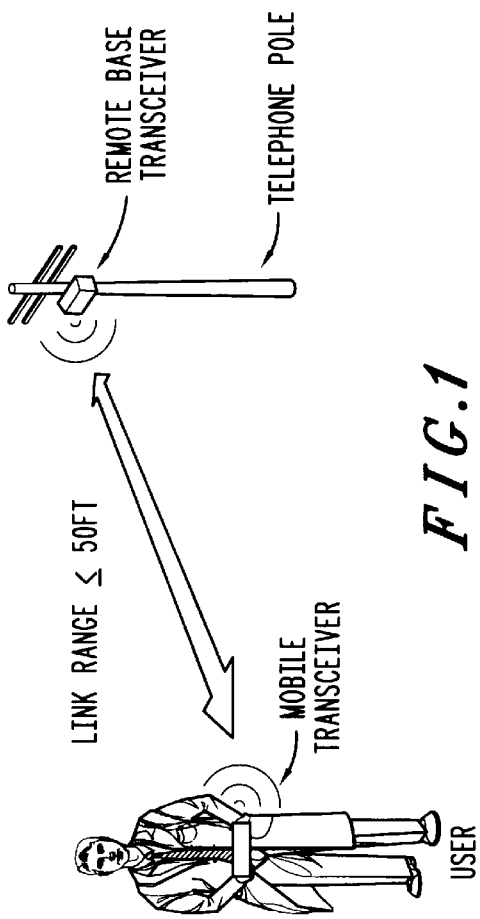
FIG. 1 depicts a mobile user and a remote base transceiver.

According to various aspects of the present invention, an interface circuit between a transceiver and an RS232 communication port includes an indicator indicating transmitting mode when receiving from the RS232 communication port a packet of data to be transmitted. At this time, the indicator turns on the transceiver to transmitting mode. A first delay circuit delays the transmit packet of data for a predetermined first delay period of time before being input to the transceiver for subsequent transmission. During the first delay period, the transmitter continues to transmit data bits having zero logic value. This allows a receiving unit at the other end of the wireless link to detect a signal thereby overcoming its response time before the packet of data bits arrive. A timer counts a period of time following transmission of a last data bit of the transmit packet of data to delay termination of the transceiver transmitting mode beyond the last data bit of the transmit packet of data. Once the delay timer expires, the transceiver switches to receiving mode.

The indicator indicates receiving mode when there is no data to be transmitted. The indicator turns on the transceiver to receiving mode. In receiving mode, a receive signal detector produces a carrier detect signal when a baseband demodulated data packet is received from the transceiver. A second delay circuit receiving the carrier detect signal produces a delayed carrier detect signal. A first AND gate produces a first delayed received data packet when receiving the delayed carrier detect signal and the received data packet. A third delay circuit receiving the first delayed received data packet produces a second delayed received data packet. A second AND gate receiving the carrier detect signal and the second delayed received data packet produces a reformatted received data packet which is inputted to the RS232 communication port. The reformatted received data packet and the packet of data from the communication port to be transmitted are compatible with RS232 data packet signaling format. In one aspect of the present invention, the transceiver is an infrared transceiver. In case of infrared transceiver, before any data being transmitted, the controller turns on the transmitter to transmitting mode for transmitting a predetermined series of data bits to a remote unit for a predetermined period of time in response to a request by the user. In response, it receives a predetermined series of data bits from the remote unit for a predetermined period of time during which the two units can be properly aligned by the user monitoring a receive signal strength indicator.

Therefore, according to one benefit of the present invention, any general purpose computer which hosts an RS232 communication port can interface with a transceiver module having the interface circuit according to the present invention. The receive and transmit data packets according to the present invention are made to be in RS232 signaling format at the RS232 connection while maintaining control over receiving and transmitting modes of the transceiver without any external control.

Figure 2:
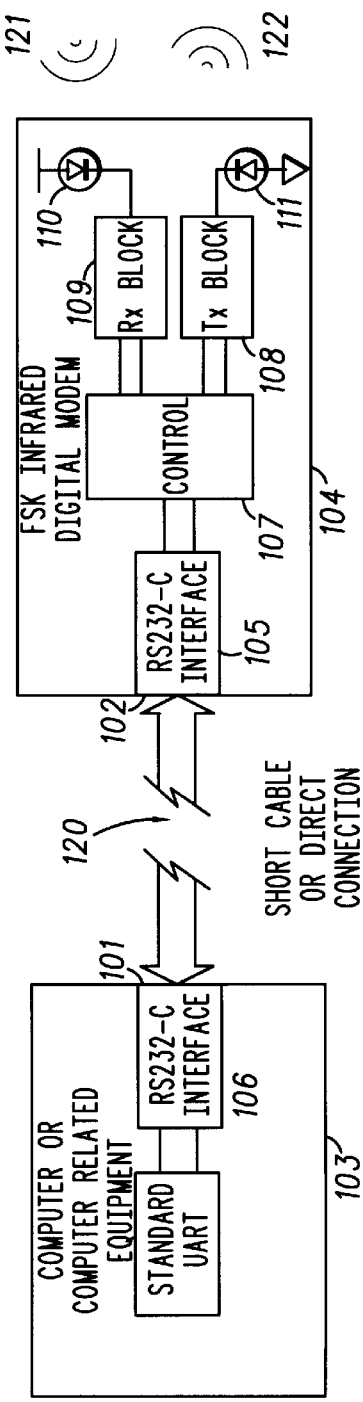
FIG. 2 depicts an overall block diagram of an interface between an RS232communication port and a transceiver module.

With reference to FIG. 2, an overall block diagram of an interface between an RS232 communication port 101 of a host computer 103 and a transceiver module 104 which includes control circuit 107 is shown. The interface blocks 106 and 105 simply provide RS232 compatible data signal voltage at connection 120 between the host computer 103 and transceiver module 104. A received signal 121, at IR or RF, is demodulated to a baseband signal in a receiver including a receiver diode 110 and a receiver (RX) block 109. The demodulated data passes through control 107, according to an aspect of the present invention, before being directed to interface 105. For transmitting an RF or IR signal 122, baseband data signal received at connection 120 passes through control 107, according to another aspect of the present invention, before modulated and upconverted to IR or RF signal 122 in a transmit (TX) block 108 and a transmit diode 111.

With reference to FIG. 3, an RS232 compliant data packet according to the prior art is shown. An RS232 data packet consists of 10 data bits. The first and last data bits, respectively at logic values one and zero, are control bits signifying beginning and end of the data packet respectively. The remaining eight bits are the data bits. Once a 10-bit RS232 data packet at connection 120 is received from the host computer 103, the data packet passes through control block 107. With reference to FIG. 4, the control block 107 adds a number of leading and trailing bits to the 10-bit data packet forming a long format data packet, according to an aspect of the present invention. The added bits all have zero logic value. The long format data packet passes to TX block 108 for transmission of the entire long format data packet. In the receiving side, RX block 109 produces the demodulated baseband signal in the long format which it then passes to the control block 107. The control block 107, according to another aspect of the present invention, removes the added data bits and reduces the long format data packet to a 10-bit RS232 compatible format before being passed to interface 105.

With reference to FIG. 5, according to various aspects of the present invention, a block diagram of controller 107 is shown. Once a data packet in 10-bit format is received at 501, a retriggerable monostable or other timing device module 502 outputs a signal 503 indicating presence of data at its input 501. The logic low of signal 503 indicates presence of data for transmission. In absence of any transmit data, signal 503 is held high indicating receiving mode. The retriggerable monostable or other timing device module 502 are obtained by making reference to MC14518 Dual Up Counter or MC14538 Dual Precision Retrigerable/Resettable Monostable Multivibrator found in Motorola Catalogue CMOS Logic Data DL131Revision 2. A copy of the catalog is available from Motorola Literature Distribution Center, P.O. Box 20912, Phoenix, Ariz. 85036. The signal 503, directly and through inverter 505, passes to logic interface 504 to control receiving mode and transmitting mode operations of the transceiver 104. Once 503 is at a logic low, TX block 108 begins to transmit. However, the transmit data packet is delayed through a delay block 506 before passing to TX block 108. The TX block 108 transmits the leading logic zero data bits before the transmit data packet arrives at the logic interface 504. The period of delay in delay 506, therefore, is equal to the period of desired leading zeros in the long format data packet. As a result, any IR or RF receiver, such as RX block 109, with a finite response time to an incoming signal receiving the leading bits would have enough time to respond to the signal before the actual data arrives.

Once the 10-bit data packet is completely received at 501 which is indicated by the last stop bit, the retriggerable monostable or other timing device 502 begins a timing cycle before changing the state of the output signal 503 from transmit mode to receive mode. The period of the timing cycle is equal to the period of desired trailing bits. Thus, the transmitter continues to transmit for the period of trailing zeros after the stop bit of the last 10-bit data packet has been transmitted. In some cases where several packets of data are being transmitted contiguously, the retriggerable monostable or other timing device 502 tracks the data envelope to indicate arrival and terminal of data packets at 502. The timing cycle for trailing bits begins once the last logic one value bit in the data envelop has arrived at 502.

Since an IR or RF receiver, without any external control, does not know when a receive signal has completely been received, the receiver continues to demodulate on a noise signal producing what is referred to as squelch tail in a related art. If the squelch tail is not properly eliminated, the noise may appear as continuation of valid data at RS232 port 101. One function of having the trailing bits is to allow the receiver to properly eliminate the squelch tail. In the preferred embodiment, the period of leading bits is equal to the period of two data bits, and the period of trailing bits is equal to 10 data bits.

In receiving mode to reformat the received signal to standard RS232 signaling format and to eliminate the squelch tail, a receive carrier detect signal 521 is produced in 504. The process of reformatting the received data and eliminating the squelch tail is graphically shown in FIG. 6 with like numerals representing the same. The carrier detect signal 521, due to inherent delay of a signal detection process, is delayed by one bit from the first leading zero in the long data packet format. The signal 521 passes through delay block 522 to produce signal 525 before being coupled to "AND" gate 523. The received signal 520 is also coupled to gate 523 to produce received data 524. As a result, the signal 524 has no leading zeros at this point. The signal 524 is passed through delay 526 to produce signal 527 which is coupled to "AND" gate 528. The carrier detect signal 521 is also coupled to gate 528. As a result, the output signal 529 at this point has no squelch tail noise. At this point, the signal 529 is correctly reformatted to standard RS232signaling format.

The process of transmitting an IR signal, according to the preferred embodiment of the present invention, is preceded by a period of line of sight alignment. This alignment is performed to find the best direction for pointing the IR transceiver to the receiving unit located at a remote location. This physical alignment is accomplished by monitoring a receive signal strength indicator (RSSI) while commanding the remote unit to transmit for a predetermined period of time allowing the operator to find the best alignment according to the strongest RSSI signal. Since the start bit of an RS232 data packet is at logic "1", the transmitter during the alignment period is transmitting all zeros such that the signal demodulation in the receiver does not create a false data detection at the RS232 communication port. The transmission period is fixed and preprogrammed in the controller.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A controller circuit between a transceiver and an RS232 communication port, comprising:

an indicator indicating transmit mode when receiving from said communication port an RS232 compatible packet of data to be transmitted which places said transceiver in transmitting mode, and indicating at other times receive mode which places said transceiver in receiving mode;

a first delay circuit for delaying said packet of data for a period of time before being inputted to said transceiver for subsequent transmission;

a timer counting a period of time following transmission of a last data bit from said packet of data for delaying termination of said transceiver transmitting mode beyond said last data bit of said packet of data;

a receive signal detector producing a carrier detect signal when a second baseband demodulated data packet is received from said transceiver while said indicator is indicating receiving mode;

a second delay circuit receiving said carrier detect signal producing a delayed said carrier detect signal;

a first AND gate receiving said delayed carrier detect signal and said received data packet producing a first delayed received data packet;

a third delay circuit receiving said first delayed received data packet producing a second delayed received data packet; and a second AND gate receiving said carrier detect signal and said second delayed received data packet producing a reformatted received data packet compatible to RS232 format for being inputted to said RS232 communication port.

2. The controller circuit as recited in claim 1 wherein said transceiver is an infrared transceiver.

3. The controller circuit as recited in claim 1 wherein said first delay circuit delaying said packet of data for said period of time equal to a period of two data bits, and said transceiver is transmitting data bits having zero logic value during said period of two data bits.

4. The controller circuit as recited in claim 1 wherein said timer counting said period of time equal to a period of ten data bits, and said transceiver is transmitting data bits having zero logic value during said period of ten data bits.

5. A controller circuit between a receiver and a communication port, comprising:

a receive signal detector producing a carrier detect signal when a baseband demodulated data packet is received from said receiver;

a first delay circuit receiving said carrier detect signal producing a delayed said carrier detect signal;

a first AND gate receiving said delayed carrier detect signal and said received data packet producing a first delayed received data packet;

a second delay circuit receiving said first delayed received data packet producing a second delayed received data packet; and a second AND gate receiving said carrier detect signal and said second delayed received data packet producing a reformatted received data packet inputted to said communication port.

* * * * *